US011067022B1

(12) United States Patent
Akagi et al.

(10) Patent No.: US 11,067,022 B1
(45) Date of Patent: Jul. 20, 2021

(54) KNOCKING DETECTION APPARATUS AND INTERNAL COMBUSTION ENGINE CONTROL APPARATUS

(71) Applicant: HITACHI AUTOMOTIVE SYSTEMS, LTD., Ibaraki (JP)

(72) Inventors: Yoshihiko Akagi, Hitachinaka (JP); Masashi Seimiya, Hitachinaka (JP); Seiji Asano, Hitachinaka (JP); Wataru Katou, Hitachi (JP); Masanori Nukui, Hitachi (JP); Masahiro Sato, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 588 days.

(21) Appl. No.: 16/071,421

(22) PCT Filed: Jan. 12, 2017

(86) PCT No.: PCT/JP2017/000697
§ 371 (c)(1),
(2) Date: Jul. 19, 2018

(87) PCT Pub. No.: WO2017/141582
PCT Pub. Date: Aug. 24, 2017

(30) Foreign Application Priority Data

Feb. 16, 2016 (JP) .............................. JP2016-026980

(51) Int. Cl.
*F02D 41/14* (2006.01)
*F02P 5/152* (2006.01)

(52) U.S. Cl.
CPC .......... *F02D 41/1497* (2013.01); *F02P 5/152* (2013.01); *F02D 2200/0404* (2013.01);
(Continued)

(58) Field of Classification Search
CPC ......... F02D 41/1497; F02D 2200/0404; F02D 2200/0406; F02D 2200/0618; F02P 5/152
USPC .......... 123/435, 436, 198 A, 406.16, 406.21, 123/406.23, 406.29, 406.34, 406.35, 123/406.36, 406.37; 701/111; 73/35.07, 73/35.09, 114.07
See application file for complete search history.

(56) References Cited

U.S. PATENT DOCUMENTS

| 4,991,553 A | 2/1991 | Kurihara et al. |
| 5,347,846 A * | 9/1994 | Kitano .................. G01L 23/225 73/35.04 |

FOREIGN PATENT DOCUMENTS

| JP | 58-45520 A | 3/1983 |
| JP | 63-295864 A | 12/1988 |

(Continued)

OTHER PUBLICATIONS

International Search Report for WO 2017/141582 A1, dated May 16, 2017.

*Primary Examiner* — Hai H Huynh
(74) *Attorney, Agent, or Firm* — Volpe Koenig (57) ABSTRACT

Provided is a knocking detection apparatus capable of reducing erroneous determination of knocking during transition, and improving knocking detection accuracy regardless of whether an engine is in steady operation or transient operation. A knocking detection apparatus according to the present invention estimates a background level based on an operating state of an internal combustion engine, and calculates a knocking determination index by using the estimated value.

9 Claims, 11 Drawing Sheets (52) U.S. Cl.
CPC .............. *F02D 2200/0406* (2013.01); *F02D 2200/0618* (2013.01)

(56) References Cited

FOREIGN PATENT DOCUMENTS

| JP | 03-47449 A | | 2/1991 | | |
|---|---|---|---|---|---|
| JP | 06-249047 A | | 9/1994 | | |
| JP | 2018091214 | * | 6/2018 | ............. | F02D 45/00 |
| JP | 2018096255 | * | 6/2018 | ............. | F02D 45/00 |

* cited by examiner

KNOCKING DETECTION APPARATUS AND INTERNAL COMBUSTION ENGINE CONTROL APPARATUS

TECHNICAL FIELD

The present invention relates to technology for detecting knocking of an internal combustion engine.

BACKGROUND ART

Depending on conditions, preignition may occur in a combustion chamber of an internal combustion engine. This may cause abnormal noise in an engine or damage to the engine due to excessive pressure in the combustion chamber. In order to prevent the above-described problems, it is necessary to accurately detect knocking.

As is well known, knocking is the following phenomenon. Vibration of gas in a combustion chamber is caused by self-ignition of unburned gas at a terminal section of the combustion chamber, and the vibration is transmitted to an engine body. It is desirable to avoid knocking whenever possible since knocking causes, for example, loss in energy generated by the engine (reduction in output), impact on each part of the engine, and also a decrease in fuel consumption. Therefore, it is essential to accurately detect occurrence of knocking.

Conventionally, as described in, for example, PTL 1 mentioned below, there is known a detector that detects occurrence of knocking by separating only a single resonant frequency component, within a range of 5 to 12 kHz, from output signals of a vibration detection sensor by use of a band pass filter, and by determining whether an integral value of the output is larger than a background level (a weighted average of past values of knock sensor signals).

The method for detecting occurrence of knocking by using only the single resonant frequency component, as disclosed in PTL 1, has a problem in that knocking cannot be accurately detected since the background level becomes large at high-speed rotation, and a resonant frequency of knocking changes as various factors of an engine change. Therefore, PTL 2 mentioned below proposes a method for detecting knocking by extracting a plurality of resonant frequency components.

PTL 3 mentioned below describes a technique for solving delay in response caused by a delay filter used for detecting a background level. According to the document, an operating state is detected through change in engine speed, and a knocking determination threshold is corrected based on the operating state.

CITATION LIST

Patent Literature

PTL 1: JP 58-45520 A
PTL 2: JP 3-47449 A
PTL 3: JP 63-295864 A

SUMMARY OF INVENTION

Technical Problem

Attempts have been made to increase the compression ratio of an engine in response to a demand for improvement of fuel economy and exhaust purification performance. Meanwhile, since knocking is likely to occur due to increase in the compression ratio, it is expected to further improve accuracy in knocking detection.

As described in PTL 2, it is necessary to solve the following problems so as to further increase knocking detection accuracy in a method for detecting knocking by extracting a plurality of resonant frequency components. That is, in order to calculate a background level to be used as one parameter for detecting knocking, it is necessary to accurately calculate an average value of knock sensor input in the case of no knocking occurring. For example, when calculating the average value by using a delay filter, it is necessary to increase the intensity of the filter. Meanwhile, delay in responsiveness is a characteristic of a delay filter in the case where an operating state changes. When much delay occurs in responsiveness, an error in ignition timing may be caused by erroneous detection of knocking occurrence in the case where an engine load changes. Thus, particularly, power performance, exhaust gas performance, fuel consumption performance, and the like may be adversely affected.

According to PTL 3, when a detection system is improved using a plurality of resonant frequencies, increase in output from a knock sensor due to not only change in engine speed but also an engine load condition are detected with high accuracy. Therefore, there is a possibility that the risk of erroneous detection similar to the above may increase due to sudden change in throttle opening degree.

The present invention has been made in consideration of the problems as described above. An object of the present invention is to provide a knocking detection apparatus which can reduce erroneous determination of knocking during transition, and improve knocking detection accuracy regardless of whether an engine is in steady operation or transient operation.

Solution to Problem

A knocking detection apparatus according to the present invention estimates a background level based on an operating state of an internal combustion engine, and calculates a knocking determination index by using the estimated value.

Advantageous Effects of Invention

The knocking detection apparatus according to the present invention can increase the intensity of smoothing processing since follow-up performance in calculating a background level during transient operation is enhanced. As a result, erroneous determination of knocking during transition can be reduced, and knock detection accuracy can be improved regardless of whether an engine is in steady operation or transient operation.

DESCRIPTION OF EMBODIMENTS

First, a general principle of knocking detection in the present invention will be described below. Then, embodiments of the present invention will be described.
<General Principle of Knocking Detection>

Vibration of an engine includes a lot of vibration components due to, for example, friction of a piston, rotation of a crankshaft, and operation of a valve. In addition, the vibration components change depending on engine conditions. When knocking occurs in an engine, vibration specific to knocking occurs. The determination as to whether knocking has occurred is made by separating the vibration specific to knocking from vibration of the entire engine detected by a vibration sensor.

Figure 1:
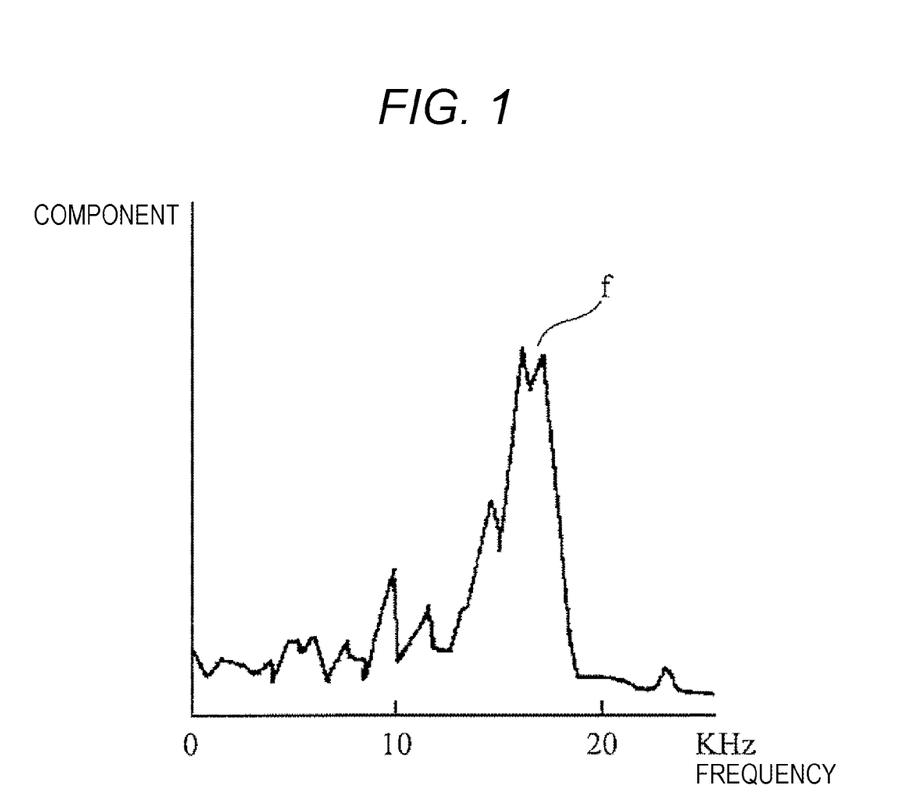
FIG. 1 is a diagram showing an analysis result of frequency components of vibration sensor output in the case of no knocking occurring.

FIG. 1 is a diagram showing an analysis result of frequency components of vibration sensor output in the case of no knocking occurring. Here, an analysis result within a range up to approximately 20 KHz is illustrated. However, the object of the present invention is not limited thereto. The same applies to the following drawings.

Figure 2:
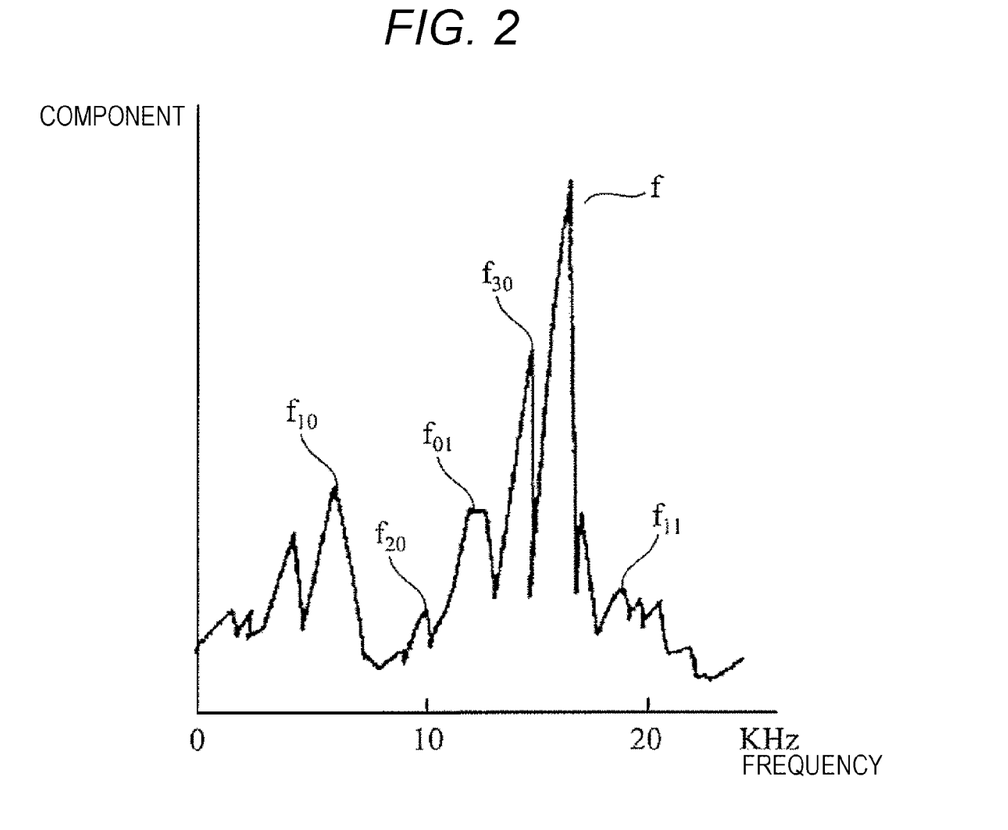
FIG. 2 is a diagram showing an analysis result of frequency components of vibration sensor output in the case of knocking occurring.

FIG. 2 is a diagram showing an analysis result of frequency components of vibration sensor output in the case of knocking occurring. As can be seen by comparing FIGS. 1 and 2, it can be understood that each resonant frequency component in the case of knocking occurring is larger than that in the case of no knocking occurring. For example, knocking occurs at frequencies in the vicinity of $f_{10}$, $f_{01}$, and $f_{11}$.

Figure 3:
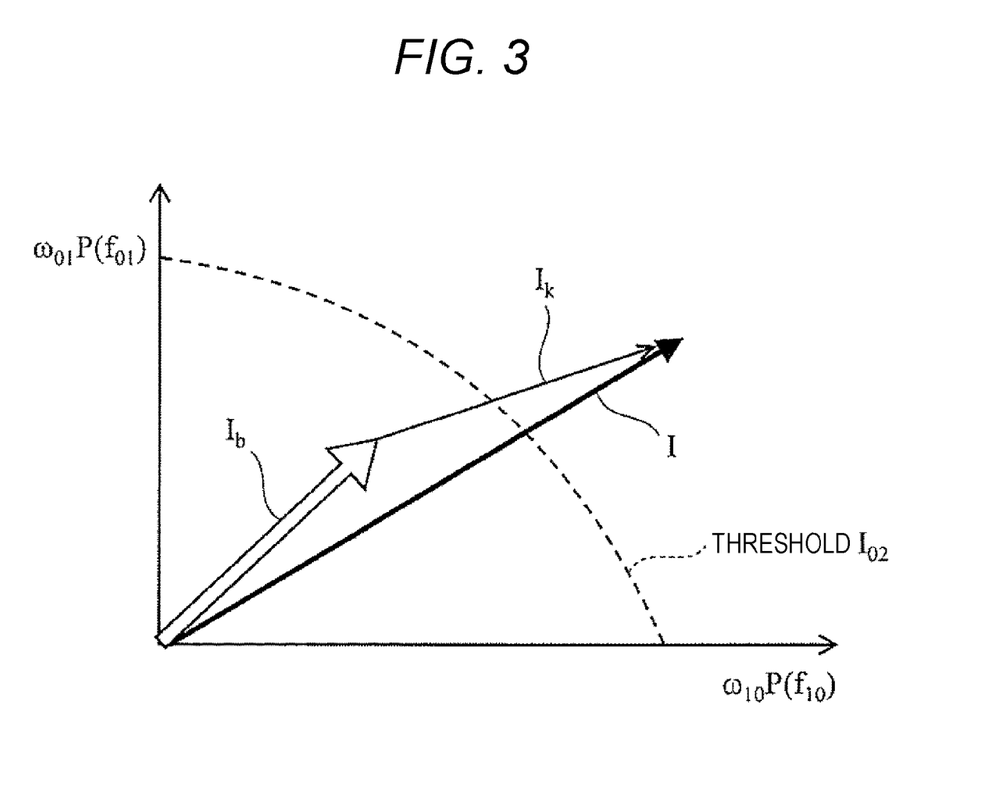
FIG. 3 is a diagram for illustrating a general principle of determining whether knocking has occurred by using a knocking determination index.

FIG. 3 is a diagram for illustrating a general principle of determining whether knocking has occurred by using a knocking determination index. For convenience, in the following description of the principle, an example of calculating a knocking determination index using resonant frequency components $\omega_{10}P(f_{10})$ and $\omega_{01}P(f_{01})$ of resonant frequencies $f_{10}$ (6.3 KHz) and $f_{01}$ (13.0 KHz) shown in FIG. 2 will be described. However, the present invention is not restricted to the above, but can determine whether knocking has occurred by using any two or more resonant frequency components.

The vibration sensor synthesizes and detects vibration caused by knocking having occurred and background vibration (vibration caused by factors other than knocking). Therefore, when knocking has not occurred, a knocking determination index I is an index $I_b$ corresponding to background vibration. When knocking has occurred, the knocking determination index I can be obtained by combining the index $I_b$ corresponding to the background vibration and an index $I_k$ corresponding to knocking.

The knocking determination index I can be expressed by the following equation 1 using main resonant frequency components. $\omega$ is an actual value determined by engine speed. $\omega$ can take a binary value of 1 or 0. P is the vibration intensity (power spectrum) for each resonant frequency component.

$$I=\omega_{10}P(f_{10})+\omega_{20}P(f_{20})+\omega_{01}P(f_{01})+\omega_{30}P(f_{30}) \quad \text{(equation 1)}$$

As shown in FIG. 3, the knocking determination index $I_b$ indicated by the resonant frequency component of background vibration is different from the index $I_k$ indicated by the resonant frequency component of vibration caused by occurrence of knocking in direction and magnitude. This corresponds to the fact that engine sound with a knock can be distinguished, based on its crisp sound and the like, from engine sound without a knock, as is clear from human hearing tests.

When vibration due to occurrence of knocking is added to background vibration, the knocking determination index I exceeds a threshold $I_{02}$. As a result, it can be determined that knocking has occurred. In the present description, not only the five terms on the right side of equation 1 but also indices calculated by combining a plurality of resonant frequency components included in output from the vibration sensor are all hereinafter defined as a knocking determination index (hereinafter referred to as a knock index).

Thus, since a knock index is calculated in consideration of a frequency component specific to occurrence of knocking in addition to background vibration, it is possible to determine whether knocking has occurred even if background vibration increases.
<Basic Concept of Knocking Detection in the Present Invention>

In the present invention, when a knock index is calculated, a background level is calculated by averaging vibration detected by the vibration sensor for each frequency component as in the conventional method. In this case, when vibration intensity suddenly changes due to, for example, increase in an engine or combustion oscillation, a calculation result of the background level cannot follow the latest state even if knocking has not occurred. As a result, there is a possibility of erroneous detection of knocking as will be described below with reference to FIG. 4.

Figure 4:
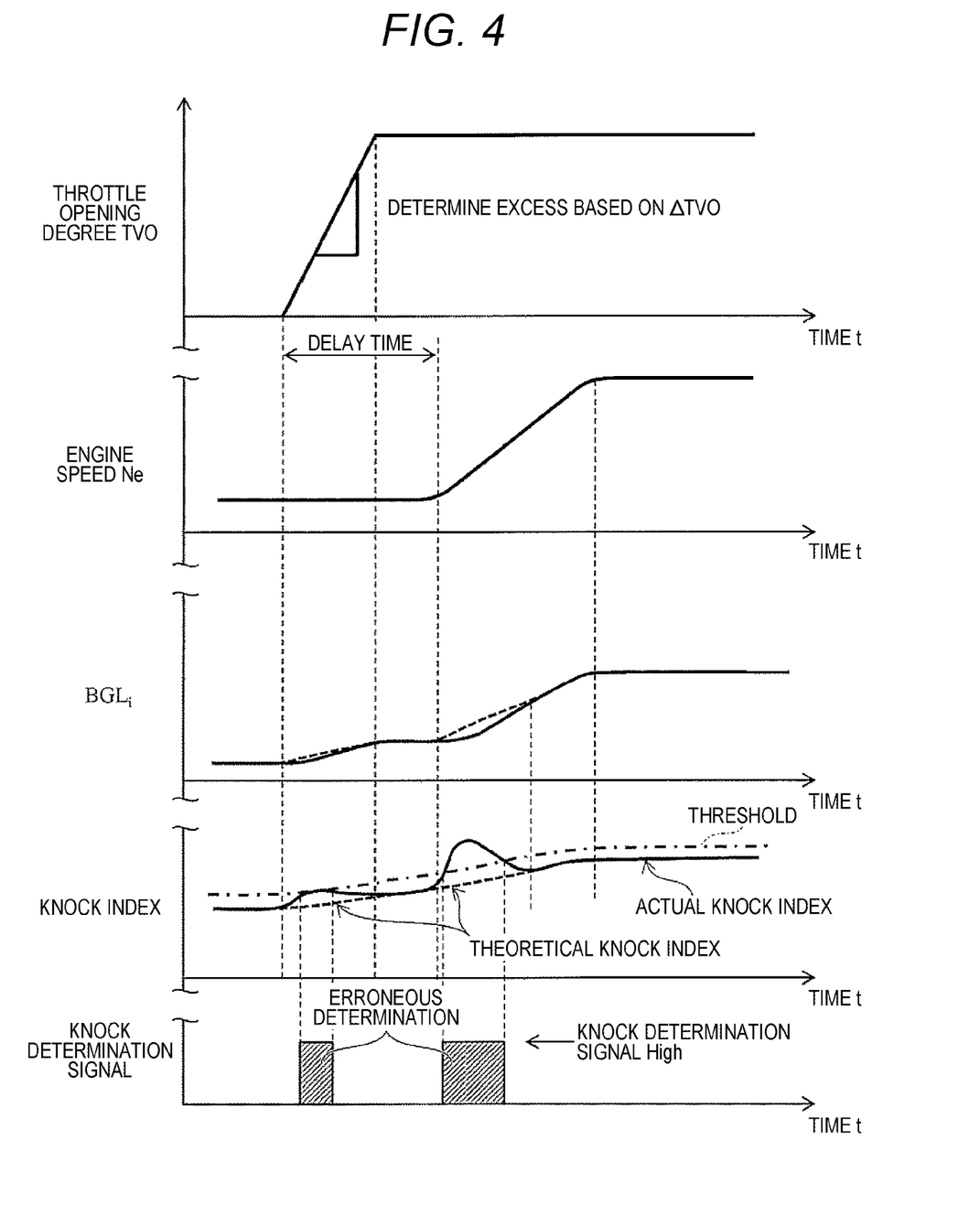
FIG. 4 is an example showing change over time, during transient operation, in throttle opening degree, engine speed, a background level $BGL_i$ of a frequency $f_i$, a knock index, and a knock determination signal (signal indicating the presence or absence of a knock).

FIG. 4 is an example showing change over time, during transient operation, in throttle opening degree, engine speed, a background level $BGL_i$ of a frequency $f_i$, a knock index, and a knock determination signal (signal indicating the presence or absence of a knock). In FIG. 4, when a throttle opening degree TVO is changed from a fully closed state to a fully opened state, engine speed Ne actually rises after a lapse of delay time. Originally, $BGL_i$ changes as indicated by a broken line. However, when $BGL_i$ is calculated by averaging processing, delay occurs as indicated by a solid line. The knock index is obtained by calculation of an S/N ratio (the ratio of each frequency component to $BGL_i$).

According to the example shown in FIG. 4, it can be understood that although knocking has not occurred, the knock index exceeds a theoretical knock index due to delay in $BGL_i$, and as a result, erroneous determination of knocking occurs. The reason will be further described.

When a background level rapidly increases, a calculation result of the background level obtained in averaging processing lags behind an actual value. In the case of using a ratio of noise to $BGL_i$ as the knock index, a lag in calculation of the background level causes a denominator of the knock index to be smaller than its actual value, and as a result, a calculation result of the knock index becomes larger than its proper value. Then, in a transient operating state, clearance between the knock index and a knock determination threshold becomes smaller, and it is possibly determined that knocking has occurred, even if knocking has not occurred. The example shown in FIG. 4 shows such a state.

As exemplified in FIG. 4, the present invention reduces erroneous determination caused by the calculation result of the background level that is unable to follow and lags behind the actual background level. Specifically, the background level is separately estimated from an operating state of an internal combustion engine, and the knock index is calculated by use of the estimation result. As a result, knocking erroneous determination due to a lag in calculation of the background level is reduced.

First Embodiment: Device Configuration

Figure 5:
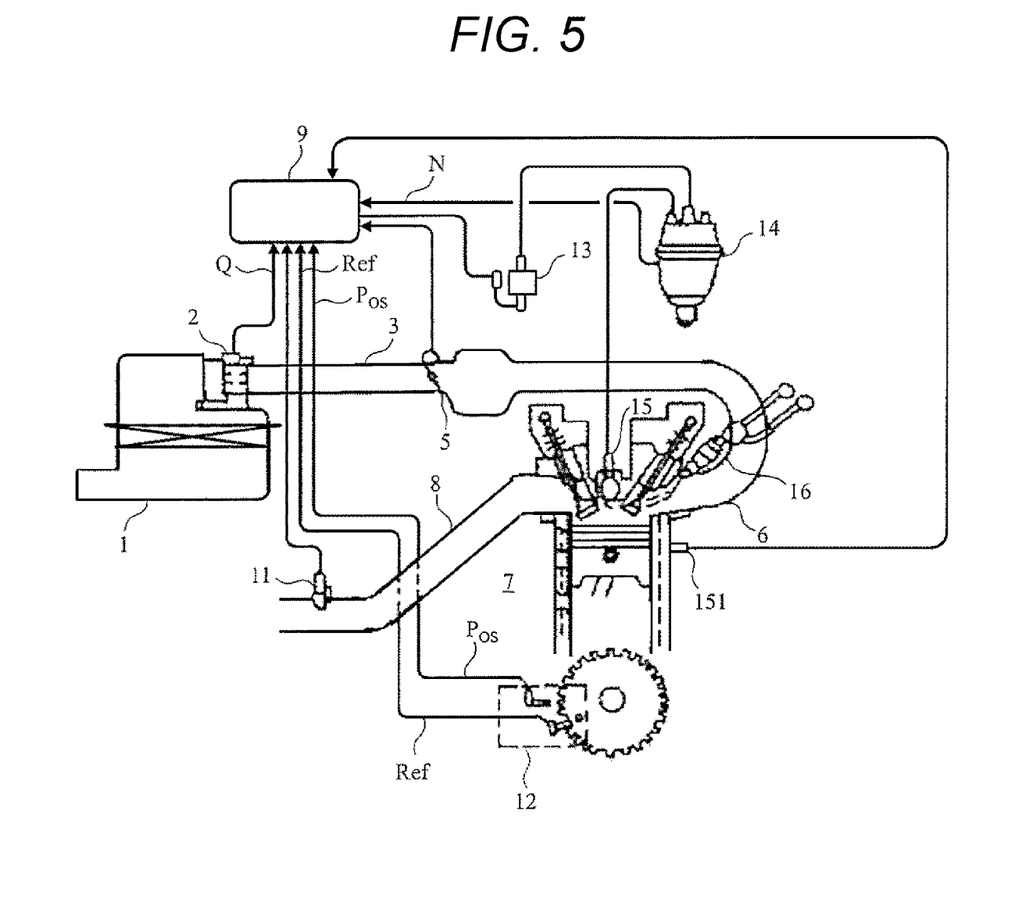
FIG. 5 is a system configuration diagram of an engine ignition device.

FIG. 5 is a system configuration diagram of an engine ignition device. Air enters from an inlet portion of an air cleaner 1, passes through a duct 3, a throttle body 5 having a throttle valve, and an intake pipe 6, and is sucked into a cylinder of an engine 7. The duct 3 is provided with a hot wire air flow meter 2. The hot wire air flow meter 2 detects an intake air quantity, and outputs a detection signal indicating the result to a control unit 9.

Fuel is injected from a fuel tank (not shown) via an injector 16, mixed with intake air in an intake passage, and supplied into the cylinder of the engine 7. The air-fuel mixture is compressed by the engine 7, and ignited by a spark plug 15. After the explosion, the air-fuel mixture is discharged from an exhaust pipe 8. The exhaust pipe 8 is provided with an exhaust sensor 11. A detection signal indicating a result of detection by the exhaust sensor 11 is input to the control unit 9.

High voltage generated by an ignition coil 13 is distributed to each cylinder by a distributor 14, and supplied to the spark plug 15. A crank angle sensor 12 detects a rotation state of the engine. The crank angle sensor 12 outputs a Ref signal indicating an absolute position for each rotation, and a POS signal indicating a position moved from the absolute position by a predetermined angle. The Ref signal and the POS signal are input to the control unit 9. A vibration sensor (combustion state sensor) 151 for detecting vibration is attached to the engine 7. A detection signal indicating a detection result is input to the control unit 9.

Figure 6:
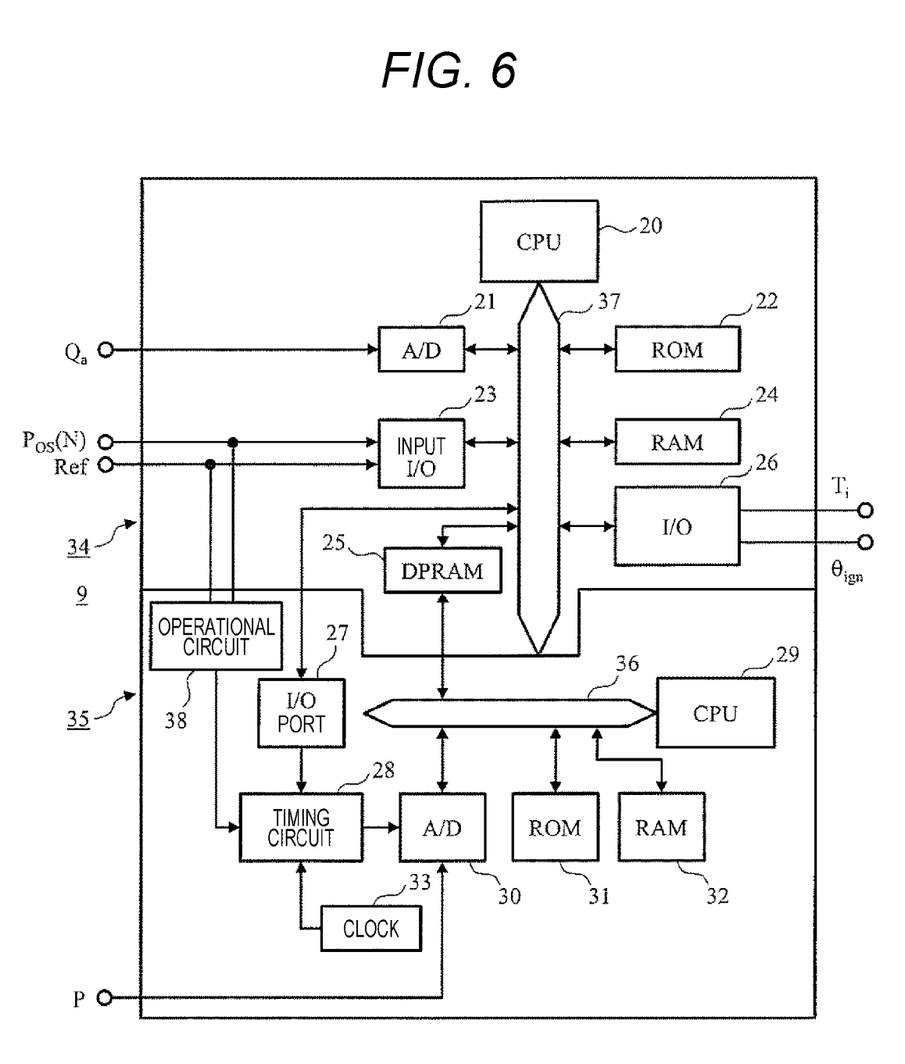
FIG. 6 is a block diagram of a control unit 9.

FIG. 6 is a block diagram of the control unit 9. The control unit 9 calculates a fuel supply amount, ignition timing, and the like based on the signals from the respective sensors, and outputs a control signal to the injector 16 and the ignition coil 13. The control unit 9 is roughly divided into a control block 34 and a knocking detection block 35.

The control block 34 includes a central control unit (CPU) 20, an A/D converter 21, a read only memory (ROM) 22, an input I/O 23, a random access memory (RAM) 24, a dual port RAM (DPRAM) 25, an output I/O 26, and a bus 37.

The knocking detection block 35 includes a CPU 29, a port 27, a timing circuit 28, an A/D converter 30, a ROM 31, a RAM 32, a clock 33, an operational circuit 38, and a bus 36. Data are exchanged between the CPUs 20 and 29 via, for example, the DPRAM 25.

The intake air quantity Qa detected by the hot wire air flow meter 2 is converted into a digital value by the A/D converter 21, and fetched in the CPU 20. The Ref signal and the POS signal detected by the crank angle sensor 12 are fetched in the CPU 20 through the input I/O 23. The CPU 20 performs calculation according to a program stored in the ROM 22. A result of the calculation is output to each actuator via the output I/O 26, as a fuel injection time signal Ti indicating a fuel injection amount, and an ignition timing signal $\theta_{ign}$ indicating ignition timing. The RAM 24 stores necessary data during arithmetic processing.

When the operational circuit 38 generates a TDC signal indicating a top dead center, the timing circuit 28 generates a sampling signal by dividing a periodic signal generated by the clock 33 according to the contents input to the port 27 by the CPU 20. When the sampling signal is generated, the A/D converter 30 converts an output signal of the vibration sensor 151 into a digital value.

A conventional vibration sensor for detecting knocking resonates at around 13 KHz. Meanwhile, in the present embodiment, a vibration sensor which resonates at 18 KHz or more is used so as to obtain resonant frequency components within a range from at least 18 to 20 KHz. In accordance with a program stored in the ROM 31, the CPU 29 stores sampled digital values in the RAM 32, and determines whether knocking has occurred according to a flowchart described below with reference to FIG. 7. The CPU 20 is notified of, via the DPRAM 25, a result of determination as to whether knocking has occurred.

First Embodiment: Knocking Determination Procedure

Figure 7:
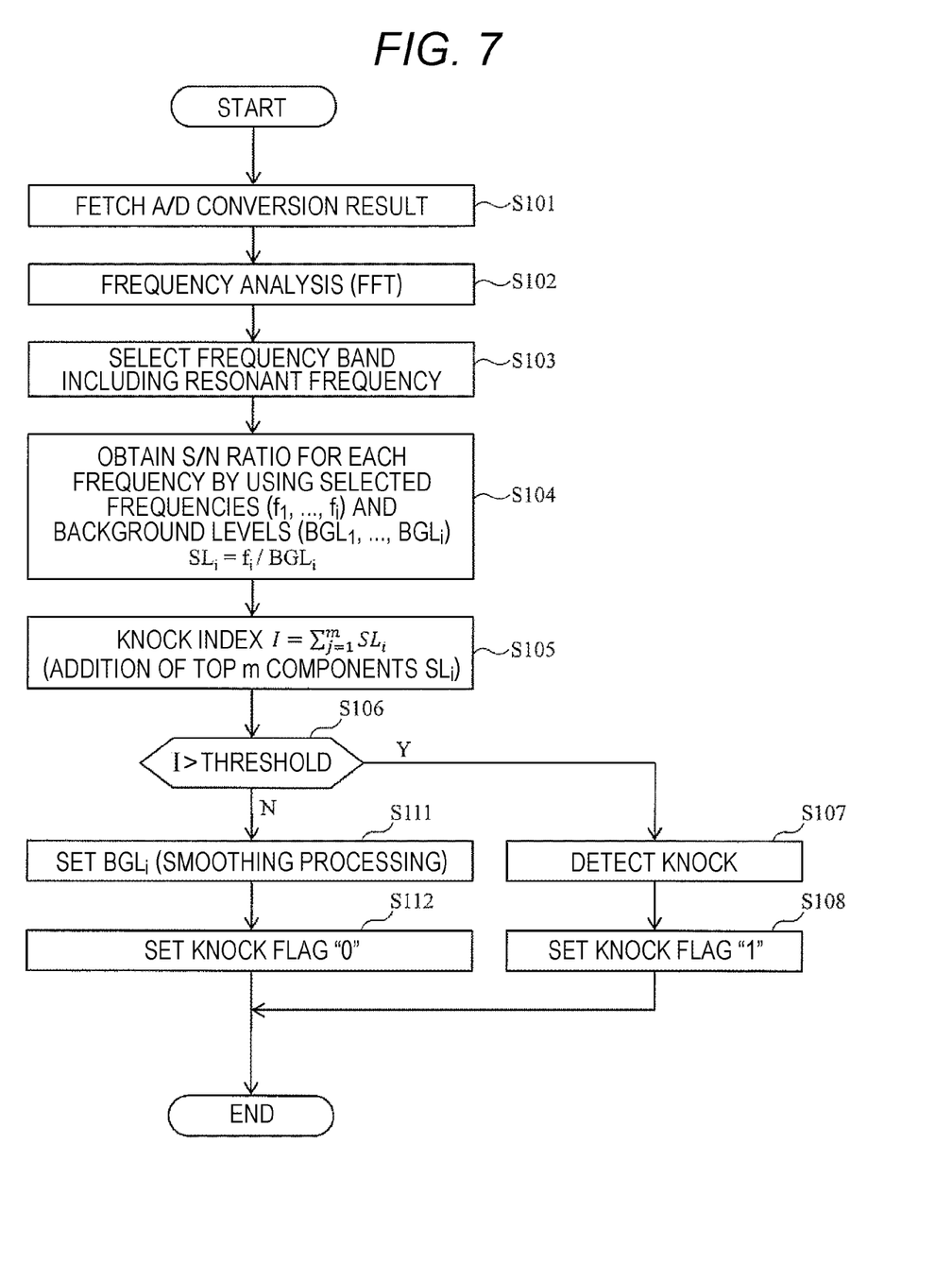
FIG. 7 is a flowchart illustrating a procedure for determining whether knocking has occurred.

FIG. 7 is a flowchart illustrating a procedure for determining whether knocking has occurred. Upon being interrupted, the CPU 29 executes the present flowchart for every explosion cycle of an engine. Each step shown in FIG. 7 will be described below.

(FIG. 7: Steps S101 and S102)

The CPU 29 fetches an A/D converted value that the A/D converter 30 has converted from the detection signal deriving from the vibration sensor 151 (S101). The CPU 29 performs frequency analysis of the detection signal of the vibration sensor 151 (S102). The frequency analysis can be performed by, for example, the fast Fourier transform or the Walsh-Fourier transform.

(FIG. 7: Step S103)

The CPU 29 selects a plurality of frequency components including a resonant frequency from among the frequency components analyzed in step S102. For example, eight resonant frequencies are selected. The frequency components to be selected in the present step can be determined in advance in accordance with, for example, an engine specification.

(FIG. 7: Step S104)

The CPU 29 obtains an S/N ratio indicating vibration intensity for each frequency component selected in step S103. Specifically, there are obtained background levels $(BGL_1, \ldots, BGL_i)$ corresponding to the selected frequency components $(f_1, \ldots, f_i)$ by smoothing processing, and an S/N ratio for each frequency, written as $SL_i = f_i/BGL_i$. When eight frequency components are selected in step S103, $SL_1$ to $SL_8$ are obtained.

(FIG. 7: Step S104: Supplement)

In the present step, the background level is not calculated by directly using signal components detected by the vibration sensor 151. Instead, a weighted average is calculated by preliminarily subtracting an estimated value of the background level. Then, the estimated value of the background level is added back. A ratio of $f_i$ to the result is calculated as $SL_i$ in the present step. A specific procedure will be described below with reference to FIGS. 8 and 9.

(FIG. 7: Step S105)

The CPU 29 extracts, out of the frequency components selected in step S103, m items in descending order of the S/N ratio obtained in step S104, and obtains the knock index I by summing the extracted items. For example, the S/N ratios of the top five frequency components can be extracted and added together.

(FIG. 7: Step S106)

The CPU 29 compares a determination threshold and the knock index I obtained in step S105 (S106). When the knock index I is larger, the process proceeds to step S107 and otherwise, proceeds to step S111.

(FIG. 7: Step S106: Supplement)

The determination threshold used in the present step may be determined in advance, or may be calculated based on an operating state such as engine speed. For example, it is possible to use a data map, in which a corresponding relationship between an operating state and a determination threshold is predefined. However, a calculation method is not limited thereto.

(FIG. 7: Steps S107 and S108)

The CPU 29 determines that knocking has occurred (S107), and sets a knock flag to "1", which indicates occurrence of knocking (S108). The knock flag is used in an ignition control task which is to be separately started.

(FIG. 7: Step S111)

The CPU 29 determines that knocking has not occurred. The CPU 29 updates the background level $BGL_i$. $BGL_i$ is obtained by applying delay filter processing to vibration intensity of the frequency components selected in step S103. Specifically, there is obtained $BGL_i$ for each frequency component, which is written as $$BGL_i = BGL \times (1-\alpha) + f_i \times \alpha.$$

(FIG. 7: Step S112)

The CPU 29 sets the knock flag to "0".

Description has been provided above with regard to the procedure for determining whether knocking has occurred in the present invention. Hereinafter, the procedure of the present invention will be described in detail in comparison with the conventional procedure for determining whether knocking has occurred.

Figure 8:
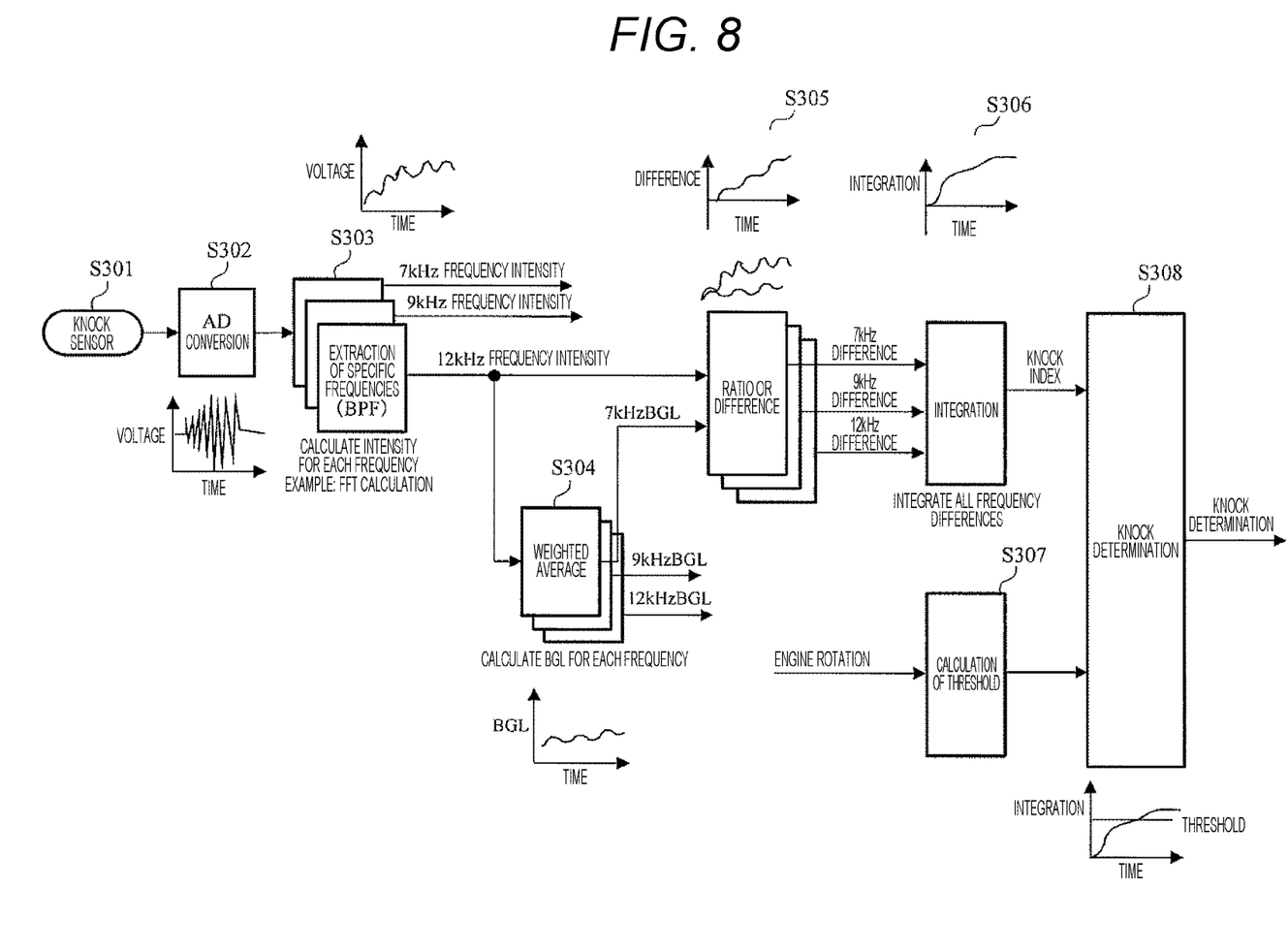
FIG. 8 is a calculation chart for illustrating the conventional procedure for determining whether knocking has occurred.

FIG. 8 is a calculation chart for illustrating the conventional procedure for determining whether knocking has occurred. Each step is to be performed by the CPU. The processing of each calculation block shown in FIG. 8 will be described below.

The vibration sensor detects vibration of the engine (S301). The AD converter converts the detection result into a digital signal (S302). By applying, for example, a band pass filter to a vibration signal, frequency components (an example of three frequency components is cited here) are extracted to be used for calculating the knock index (S303). The CPU calculates a weighted average for each frequency component (S304). The CPU converts the calculated weighted average into an appropriate index (for example, the ratio to the background level described in step S104) (S305). The CPU obtains the knock index by summing indices of the respective frequency components (S306). A knock determination threshold can be obtained in a manner similar to that in step S106 (S307). The CPU determines whether knocking has occurred by comparing the knock index and the knock determination threshold.

Each calculation block shown in FIG. 8 also includes a diagram schematically showing calculation results in transient operation. In the transient operation, the frequency component increases with time. When the background level is calculated by the weighted average method in S304, the background level is obtained as a value smaller than an actual value. As a result, the knock index increases, and a possibility of erroneous determination arises.

Figure 9:
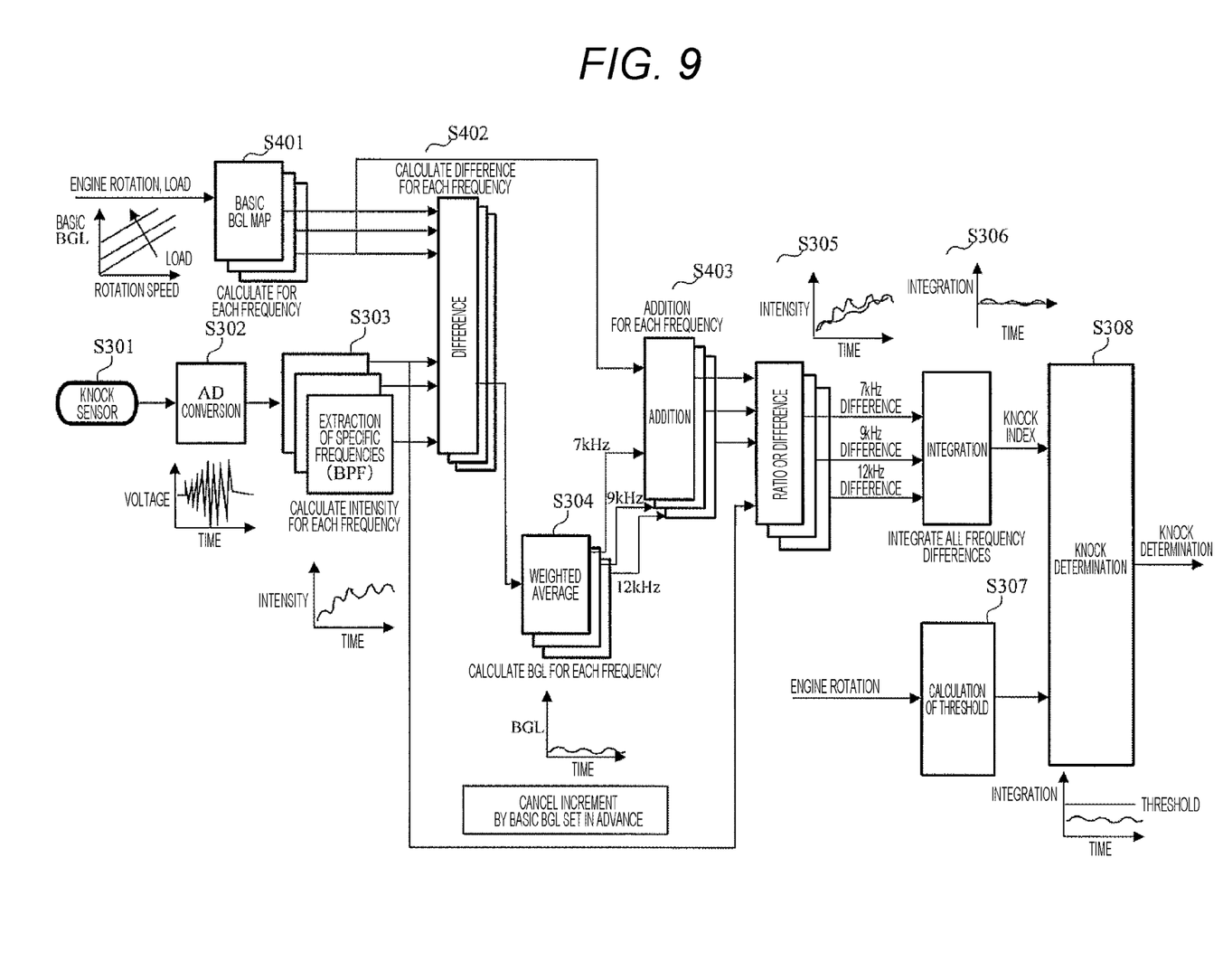
FIG. 9 is a calculation chart for illustrating a procedure of the present invention for determining whether knocking has occurred.

FIG. 9 is a calculation chart for illustrating a procedure for determining whether knocking has occurred in the present invention. Each step is to be performed by the CPU 29. The processing of each calculation block shown in FIG. 9 will be described below.

Steps S301 to S303 are similar to those in the prior art. The steps correspond to S101 to S103 shown in FIG. 7.

In step S401, the CPU 29 estimates an operating state of the engine based on, for example, engine speed and a load. The ROM 31 stores, in advance, map data describing a corresponding relationship between an operating state of an engine and a standard background level in the operating state. The background level is described for each frequency component. The CPU 29 estimates the background level in the current operating state by referring to the map data based on the estimated operating state. The present step corresponds to the processing described in "step S104: Supplement".

In step S402, the CPU 29 subtracts a background level of the corresponding frequency component for each frequency component extracted in step S303. As a result, fluctuation in the background level due to change in rotation speed and a load is not input in the subsequent calculation of a weighted average. Therefore, it is possible to reduce follow-up delay associated with the weighted average processing. However, the background level subtracted in the present step is to be added back for each frequency component in step S403 after calculation of a weighted average. The present step corresponds to the processing described in "step S104: Supplement".

Step S304 is similar to that in the prior art. However, step S304 is different therefrom in the respect that the background level is preliminarily subtracted for each frequency component, and then a weighted average is calculated for each frequency component. In step S403, the CPU 29 adds back the background level subtracted in step S402 to a weighted average result for each frequency component. As a result, a signal level is returned to a level prior to the subtraction. The steps correspond to the processing described in "step S104: Supplement".

Step S305 is similar to that in the prior art, and corresponds to step S104. However, a denominator in calculation of the S/N ratio $SL_i$ is a result of step S403, and a numerator is the frequency component extracted in step S303. Unlike the prior art, it is possible to reduce erroneous determination due to transient variation since transient variation of the background level is eliminated before reaching the present step through steps S304 and S403. Step S306 and subsequent steps are similar to those in the prior art, and correspond to step S105 and the subsequent steps.

Figure 10:
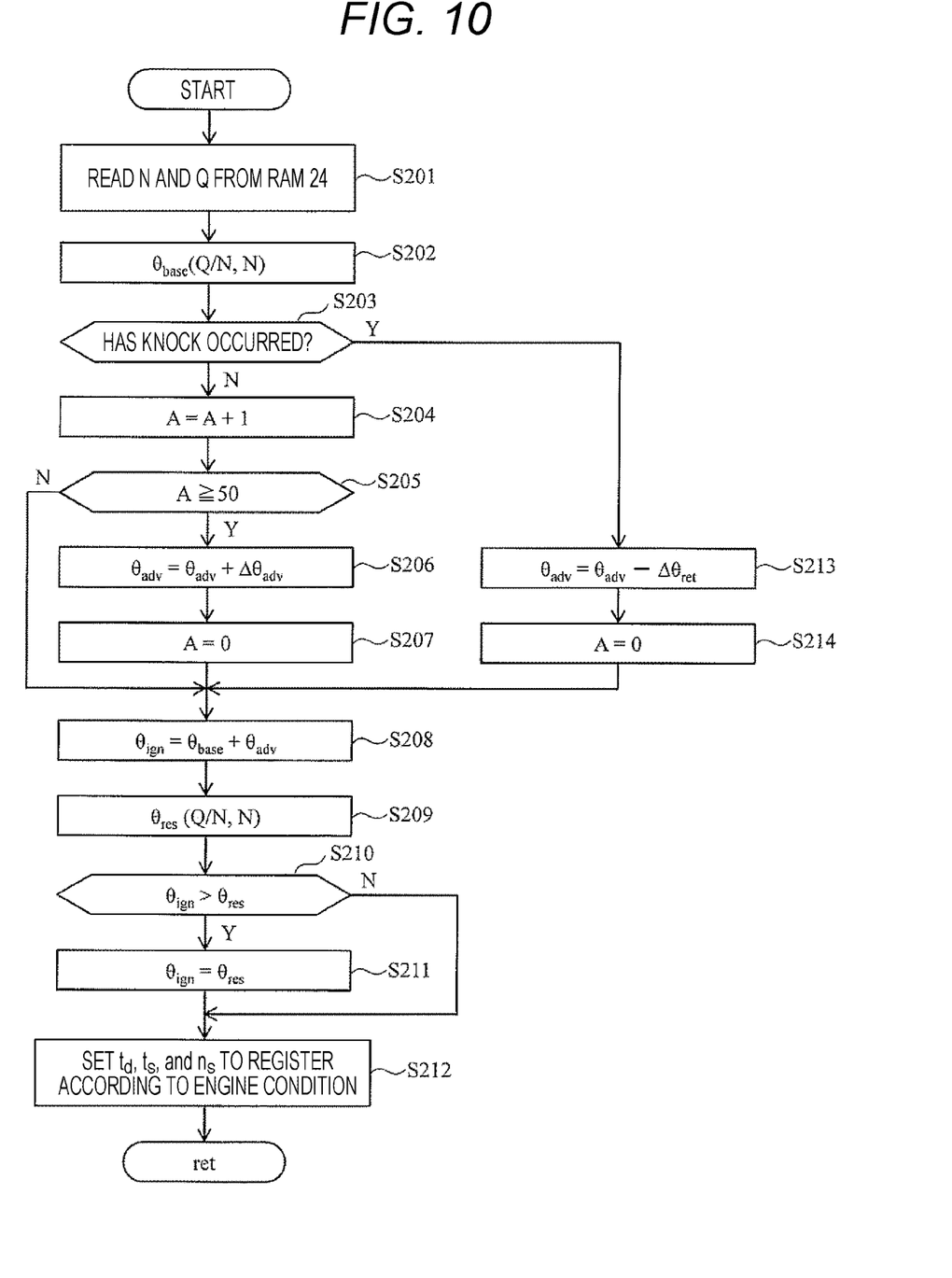
FIG. 10 is a flowchart for illustrating a procedure in which a CPU 20 calculates ignition timing.

FIG. 10 is a flowchart for illustrating a procedure in which the CPU 20 calculates ignition timing. The CPU 20 is periodically activated (for example, every 10 msec). Each step shown in FIG. 10 will be described below.

(FIG. 10: Step S201)

The CPU 20 reads engine speed N and an intake air quantity Q from a predetermined register set in the RAM 24.

(FIG. 10: Step S202)

The CPU 20 calculates an intake air quantity per unit rotation number Q/N (basic fuel injection amount), and further obtains fuel injection duration $T_i$ from the intake air quantity Q/N. The CPU 20 obtains basic ignition timing $\theta_{base}$ from a basic ignition timing map stored in the ROM 22. The basic ignition timing map is a data map describing a corresponding relationship among the intake air quantity Q/N, the rotation speed N, and the basic ignition timing $\theta_{base}$.

(FIG. 10: Step S203)

The CPU 20 determines whether knocking has occurred in accordance with the knock flag (obtained by the CPU 29 according to FIG. 7). When knocking has occurred, the process proceeds to step S213. When knocking has not occurred, the process proceeds to step S204.

(FIG. 10: Step S213)

The CPU 20 subtracts a predetermined retardation amount $\Delta\theta_{ret}$ from the ignition timing $\theta_{adv}$. The ignition timing is retarded by the subtraction.

(FIG. 10: Step S214)

The CPU 20 initializes a count value A, and proceeds to step S208. The count value A is a variable for counting the number of occurrences of knocking. The way to use the count value A will be described in the following steps.

(FIG. 10: Step S204)

The CPU 20 increments the count value A by one (S204). The CPU 20 determines whether the count value A has reached a predetermined value (for example, 50). When the count value A has reached the predetermined value, the process proceeds to step S206, and otherwise, the process skips to step S208.

(FIG. 10: Steps S206 and S207)

The CPU 20 adds a predetermined advance angle amount $\Delta\theta_{adv}$ to an advance angle value $\theta_{adv}$. The ignition timing retarded in step S213 is recovered by the addition. In the case of the present flowchart being started every 10 msec, after initialization of the count value A, 0.5 sec elapses before the count value A reaches 50. In other words, the present step recovers the ignition timing every 0.5 sec elapsed after retarding the ignition timing due to occurrence of knocking. The CPU 20 initializes A.

(FIG. 10: Step S208)

The CPU 20 calculates the ignition timing $\theta_{ign}$ by adding the advance angle value $\theta_{adv}$ to basic ignition timing $\theta_{base}$.

(FIG. 10: Step S209)

The CPU 20 reads a maximum advance angle value $\theta_{res}$ from a maximum advance angle value map stored in the ROM 22. The maximum advance angle value map is a data map describing a corresponding relationship among the intake air quantity Q/N, the rotation speed N, and the basic ignition timing $\theta_{res}$.

(FIG. 10: Steps S210 and S211)

The CPU 20 determines whether the ignition timing $\theta_{ign}$ has exceeded the maximum advance angle value $\theta_{res}$. When the ignition timing $\theta_{ign}$ has not exceeded the maximum advance angle value $\theta_{res}$, the process skips to step S212. When the ignition timing $\theta_{ign}$ has exceeded the maximum advance angle value $\theta_{res}$, the ignition timing $\theta_{ign}$ is set to the maximum advance angle value $\theta_{res}$ in step S211 since $\theta_{ign}$ is excessively advanced.

(FIG. 10: Step S212)

The CPU 20 outputs, to the port 27, delay time td, the number of sampling points $n_s$, and a division ratio $t_s$ according to engine conditions. A sampling period of the digital value of the output from the vibration sensor 151 is determined by the division ratio $t_s$. The number of sampling points is determined by the number of sampling points $n_s$.

First Embodiment: Summary

The control unit (knocking detection apparatus) 9 according to the first embodiment calculates a weighted average by preliminarily subtracting an estimated value of the background level from the frequency component of the vibration sensor 151, and then, adds back the estimated value of the background level. As a result, transient variation of the background level is excluded from the weighted average processing. Therefore, it is possible to reduce a lag in calculation associated with the transient variation, and also reduce erroneous detection of knocking due to the lag in calculation. Therefore, it is possible to optimally control ignition timing in every operating state.

Second Embodiment

Figure 11:
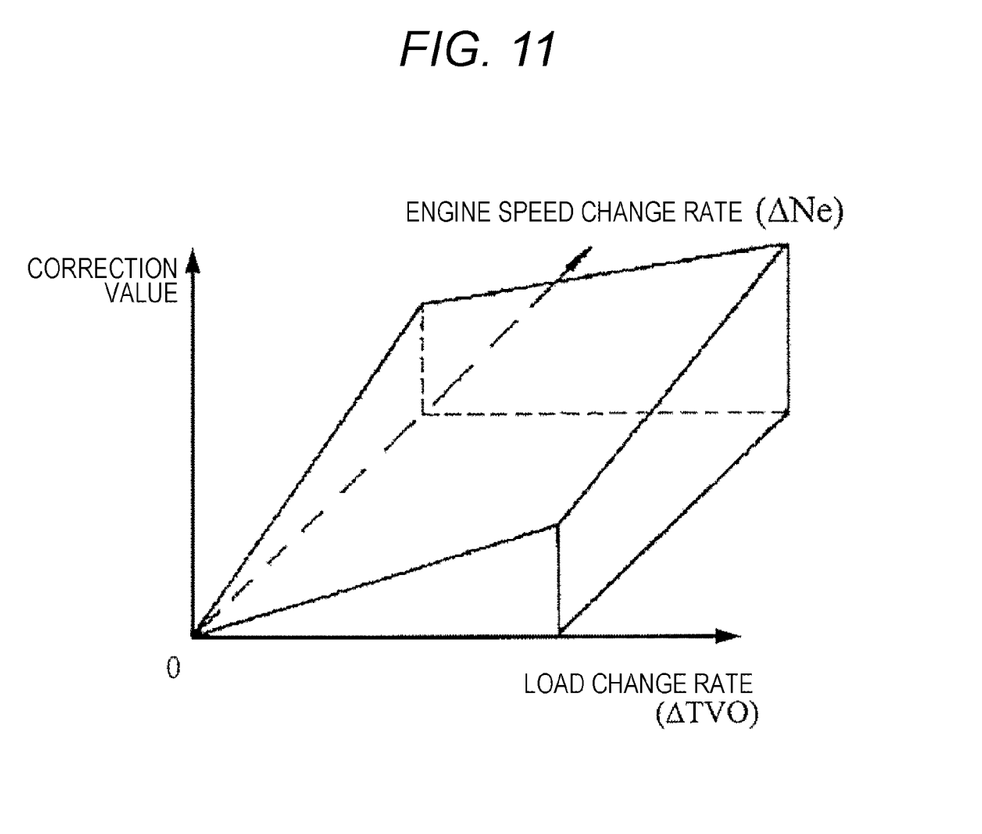
FIG. 11 is an image diagram of map data describing estimated values of a background level.

FIG. 11 is an image diagram of map data describing estimated values of a background level. The map data describes a corresponding relationship among engine speed (or a change rate thereof), an engine load (or a change rate thereof), and the background level (or a correction value for a specified level). In the example shown in FIG. 11, the background level tends to increase on the high rotation side/high load side.

As another method of estimating the background level, the following method may be adopted. A CPU 29 obtains sensor signals indicating loading states, and estimates an operating state based on the signals. Examples of the sensor signals include a throttle sensor signal (a signal indicating throttle opening degree), an intake air quantity signal (a signal indicating an intake air quantity for an engine), a fuel injection pulse signal (a pulse signal for instructing fuel injection), and an intake pipe pressure signal (a signal indicating pressure inside an intake pipe 6). It is possible to describe a corresponding relationship between the signals and the operating state by using, for example, map data similar to that shown in FIG. 11. Alternatively, it is also possible to calculate the operating state by another appropriate method. Furthermore, it is also possible to use map data of the engine speed and the engine load shown as an example in FIG. 11, together.

<Variations of the Present Invention>

The present invention is not limited to the above-described embodiments, but also includes various variations. For example, the description of the embodiments, which has been provided above in detail, is intended to describe the present invention in an easily understandable manner and accordingly, the above-described embodiments are not necessarily limited to the one that includes all the configurations described above. In addition, it is possible to replace a part of the configuration of an embodiment with the configuration of another embodiment, and also possible to add, to the configuration of an embodiment, the configuration of another embodiment. Furthermore, it is also possible to add another configuration to a part of the configuration of each embodiment, delete a part of the configuration of each embodiment, and replace a part of the configuration of each embodiment with another configuration.

In the above embodiments, it has been described that the CPU 29 (corresponding to a frequency analyzer, a smoothing device, a background level estimator, an index calculator, and a determination device) implements each step for knocking detection by executing software. Meanwhile, equivalent functions may be implemented by hardware such as a circuit device. For example, a circuit device may implement any one or more of frequency analysis, smoothing processing, processing of acquiring estimated values from map data, calculation of knock indices, and threshold determination.

A characteristic of output from the vibration sensor 151 attached to a cylinder block is that the output increases as engine speed or a load increases. This is due to mechanical noise such as piston sludge inside the engine or change in combustion mode. Therefore, in step S103, it is possible to select a different frequency component for each cylinder.

In order to acquire injector noise caused by operation of the injector 16, the vibration sensor 151 sets a period, during which the injector 16 operates, as a sampling window, and acquires injector noise in the window. Since the injector noise is unnecessary for calculation of the knock index, it is desirable to eliminate the injector noise. Therefore, it is possible to adopt the following measures. Data describing assumed injector noise are stored in, for example, the ROM 22 in advance. The CPU 29 subtracts the injector noise from a result of detection by the vibration sensor 151 in the sampling window. Thus, it is possible to accurately calculate the knock index without being affected by the injector noise.

The map data, which describes estimated values of the background level, describes standard background levels. Therefore, it is desirable not to describe transient variation of the background level in the map data. For example, it is assumed that when engine speed or an engine load rapidly increases, the background level also rapidly increases. Such a rapid change in the background level is not to be described in the map data. Specifically, it is desirable to describe, in the map data, only the background levels having a fluctuation rate within a certain range.

It is not always necessary to extract all the frequency components from the result of detection by the vibration sensor 151. For example, it is possible to extract only representative frequency components, and compensate other frequency components by interpolation processing. It is possible to determine an arithmetic expression for interpolation processing in advance based on, for example, a test result. As a result, the calculation load for extracting frequency components can be reduced.

In the above embodiments, the ratio (S/N ratio) of the frequency component to the background level is calculated as the knock index for the frequency component. However, as the knock index, the difference with respect to the background level may be used instead of the ratio.

REFERENCE SIGNS LIST 1 air cleaner
2 hot wire air flow meter
3 duct
5 throttle body
6 intake pipe
7 engine
8 exhaust pipe
9 control unit
11 exhaust sensor
12 crank angle sensor
13 ignition coil
14 distributor
15 spark plug
16 injector
151 vibration sensor

The invention claimed is:

1. A knocking detection apparatus for detecting knocking of an internal combustion engine, comprising:
a vibration sensor which detects vibration of the internal combustion engine;
a frequency analyzer which extracts two or more frequency components from the vibration detected by the vibration sensor;
a smoothing device which calculates background levels of the vibration of the internal combustion engine by smoothing the frequency components;
a background level estimator which acquires estimated values of the background level of the internal combustion engine based on an operating state of the internal combustion engine;
an index calculator which calculates a knocking index indicating whether knocking of the internal combustion engine has occurred by using the frequency components, the background levels, and the estimated values; and
a determination device which determines whether knocking of the internal combustion engine has occurred by comparing the knocking index and a determination threshold.

2. The knocking detection apparatus according to claim 1, wherein
the index calculator calculates the knocking index by smoothing the frequency components after subtracting the estimated values from the frequency components, and summing the smoothed frequency components.

3. The knocking detection apparatus according to claim 2, wherein
the background level estimator acquires the estimated values for respective frequencies corresponding to the frequency components, and
the index calculator calculates the knocking index by adding the estimated values for the respective frequencies to the smoothed frequency components.

4. The knocking detection apparatus according to claim 3, wherein
the index calculator calculates the knocking index by calculating, for each of the frequencies, a ratio of the frequency component to a result of addition of the estimated values for the respective frequencies or a difference between the frequency component and the result of the addition thereof, and by summing results of calculation for each of the frequencies.

5. The knocking detection apparatus according to claim 1, further comprising:
a storage device which stores map data describing a corresponding relationship among a load of the internal combustion engine, rotation speed of the internal combustion engine, and the estimated value, wherein
the background level estimator acquires the estimated values with reference to the map data by using the load of the internal combustion engine and the rotation speed of the internal combustion engine.

6. The knocking detection apparatus according to claim 1, wherein
the background level estimator acquires at least one of:
a throttle sensor signal indicating an opened or closed state of a throttle provided in the internal combustion engine;
an intake air quantity signal indicating an intake air quantity for the internal combustion engine;
a fuel injection pulse signal for instructing fuel injection inside the internal combustion engine; and
an intake pipe pressure signal indicating pressure inside an intake pipe connected to the internal combustion engine, and
the background level estimator acquires the estimated values by using at least one of the acquired throttle sensor signal, the acquired intake air quantity signal, the acquired fuel injection pulse signal, and the acquired intake pipe pressure signal.

7. The knocking detection apparatus according to claim 1, further comprising:
- a storage device which stores data describing assumed values of injector noise generated by an injector provided in the internal combustion engine, wherein
- the smoothing device eliminates a component corresponding to the injector noise by subtracting the assumed value from the frequency component.

8. The knocking detection apparatus according to claim 1, wherein
- the smoothing device compensates a frequency component, which has not been extracted by the frequency analyzer, by interpolation using the frequency components extracted by the frequency analyzer.

9. An internal combustion engine control apparatus, comprising:
- the knocking detection apparatus according to claim 1; and
- a control device which controls ignition timing of the internal combustion engine by using the knocking index.

\* \* \* \* \*